United States Patent
Metzger et al.

(10) Patent No.: US 7,062,986 B2
(45) Date of Patent: Jun. 20, 2006

(54) METHODS AND APPARATUS FOR OPERATING A MOTOR VEHICLE

(75) Inventors: Jörg Metzger, Bühlertal (DE); Alexander Schweizer, Walzbachtal-Jöhlingen (DE); Frank Bast, Kürnbach (DE); Christian Rieger, Bischweier (DE); Johannes Moosheimer, Bühl (DE); Michael Gallion, Warwick (GB); Florian Strack, Strassburg (FR)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 12 days.

(21) Appl. No.: 10/682,656

(22) Filed: Oct. 9, 2003

(65) Prior Publication Data

US 2004/0132580 A1    Jul. 8, 2004

(30) Foreign Application Priority Data

Oct. 9, 2002   (DE) ............................... 102 46 982

(51) Int. Cl.
  *F16H 59/00*   (2006.01)
  *B60K 20/00*   (2006.01)
  *G05G 13/00*   (2006.01)

(52) U.S. Cl. ................... 74/335; 74/473.21; 74/471
(58) Field of Classification Search ........... 477/109, 477/174, 180; 123/406.23; 701/54; 74/335, 74/337.5, 473.1, 473.13, 771
See application file for complete search history.

(56) References Cited

U.S. PATENT DOCUMENTS

| 2,929,260 | A | * | 3/1960 | Hodkin ............. 74/473.21 |
| 4,633,987 | A | * | 1/1987 | Rogner et al. ............. 74/745 |
| 4,912,997 | A | * | 4/1990 | Malcolm et al. ........... 74/335 |
| 5,135,091 | A |   | 8/1992 | Albers et al. |
| 5,150,629 | A | * | 9/1992 | Morris et al. ............ 74/337.5 |
| 5,217,412 | A |   | 6/1993 | Indelkofer et al. |
| 5,295,915 | A |   | 3/1994 | Friedmann |
| 5,409,091 | A |   | 4/1995 | Reik et al. |
| 5,547,434 | A | * | 8/1996 | Graf et al. ............... 477/109 |
| 5,740,695 | A | * | 4/1998 | Janson .................. 74/337.5 |
| 5,947,863 | A | * | 9/1999 | Grob et al. .............. 477/109 |
| 6,104,974 | A | * | 8/2000 | Zhang et al. ............... 701/51 |
| 6,227,067 | B1 | * | 5/2001 | Steeby et al. .......... 74/473.12 |
| 6,341,537 | B1 | * | 1/2002 | Tornatore ............... 74/337.5 |
| 6,524,223 | B1 | * | 2/2003 | Graf et al. ............... 477/109 |
| 6,575,873 | B1 | * | 6/2003 | Carl et al. ............... 477/107 |
| 6,729,200 | B1 | * | 5/2004 | Paetzold ............... 74/473.25 |
| 6,766,238 | B1 | * | 7/2004 | Graf et al. ................. 701/54 |
| 2003/0148851 | A1 | * | 8/2003 | Koerner et al. .......... 477/109 |
| 2004/0214687 | A1 | * | 10/2004 | Morisawa et al. ........ 477/109 |

* cited by examiner

*Primary Examiner*—Roger Pang
(74) *Attorney, Agent, or Firm*—Michael Best & Friedrich LLP

(57) ABSTRACT

Methods and apparatus are taught for controlling the operation of a power train in a motor vehicle (1), which may include controlling a clutch actuating mechanism (20) so as to open a clutch (3) in a vehicle pull mode. Then, a transmission (4) may be changed from a first gear position to a second gear position via a neutral position by moving a transmission actuator. At or about the same time, the ignition angle of a spark-ignited combustion engine (2) is preferably shifted during the gear change step to cause the combustion engine to generate a negative engine torque. As a result, engine speed is decreased when the transmission is disposed in the neutral position and a desired engine torque can be rapidly realized as soon as the transmission actuator is disposed in the second gear position. Thereafter, the clutch is closed again.

11 Claims, 3 Drawing Sheets

# METHODS AND APPARATUS FOR OPERATING A MOTOR VEHICLE

CROSS-REFERENCE

This application claims priority to German patent application no. 102 46 982.2, which was filed Oct. 9, 2002, the contents of which are incorporated by reference as if fully set forth herein.

TECHNICAL FIELD

The present invention relates to methods and apparatus (or arrangements) for operating a motor vehicle having a power train which includes a drive source or prime mover, such as a motor and/or an engine and a transmission. The invention also relates to designs for and utilization of a power train.

RELATED ART

Commonly-owned U.S. Pat. Nos. 5,409,091, 5,295,915, 5,217,412 and 5,135,091 describe various power trains for motor vehicles, including power trains having automatically adjustable friction clutches, continuously variable speed transmissions and automated transmissions.

SUMMARY OF THE INVENTION

It is one object of the present invention to teach improved methods and apparatus for operating a motor vehicle, and more particularly, the power train of the motor vehicle. Various aspects of the present teachings are provided hereinbelow.

In one aspect of the present teachings, improved methods and apparatus for controlling the operation of the power train in a motor vehicle are provided. For example, methods and apparatus are taught for changing or shifting the ignition angle of the internal combustion engine during a gear change operation in order to actively reduce or decrease engine speed during the gear change operation. These methods and apparatus advantageously enable the engine torque to recover more rapidly when the gear change operation has been completed. Thus, the generation of the engine torque transmission can be improved after a gear change operation and the time interval that is required to reengage the clutch following a gear change operation can be reduced.

In another aspect of the present teachings, improved power trains may include means for operating the drive motor, an actuator for the transmission and/or the actuating arrangement for the clutch of the power train in accordance with the improved methods taught herein.

In a further aspect, improved guides or guide means may be provided for a gear shift lever that is utilized to shift the transmission into selected gears.

An additional aspect provides improved methods and apparatus for preventing a shifting of the transmission into a wrong or incorrect gear during a towing operation.

Still another aspect provides improved systems of sensors for use as monitoring devices for a power train.

A further aspect provides improved strategies for shifting a transmission, especially an automated transmission, of a power train into selected gears.

An additional aspect provides automated transmissions that can be shifted into a desired gear while minimizing the operator input to initiate the gear change operation.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

Figure 1:
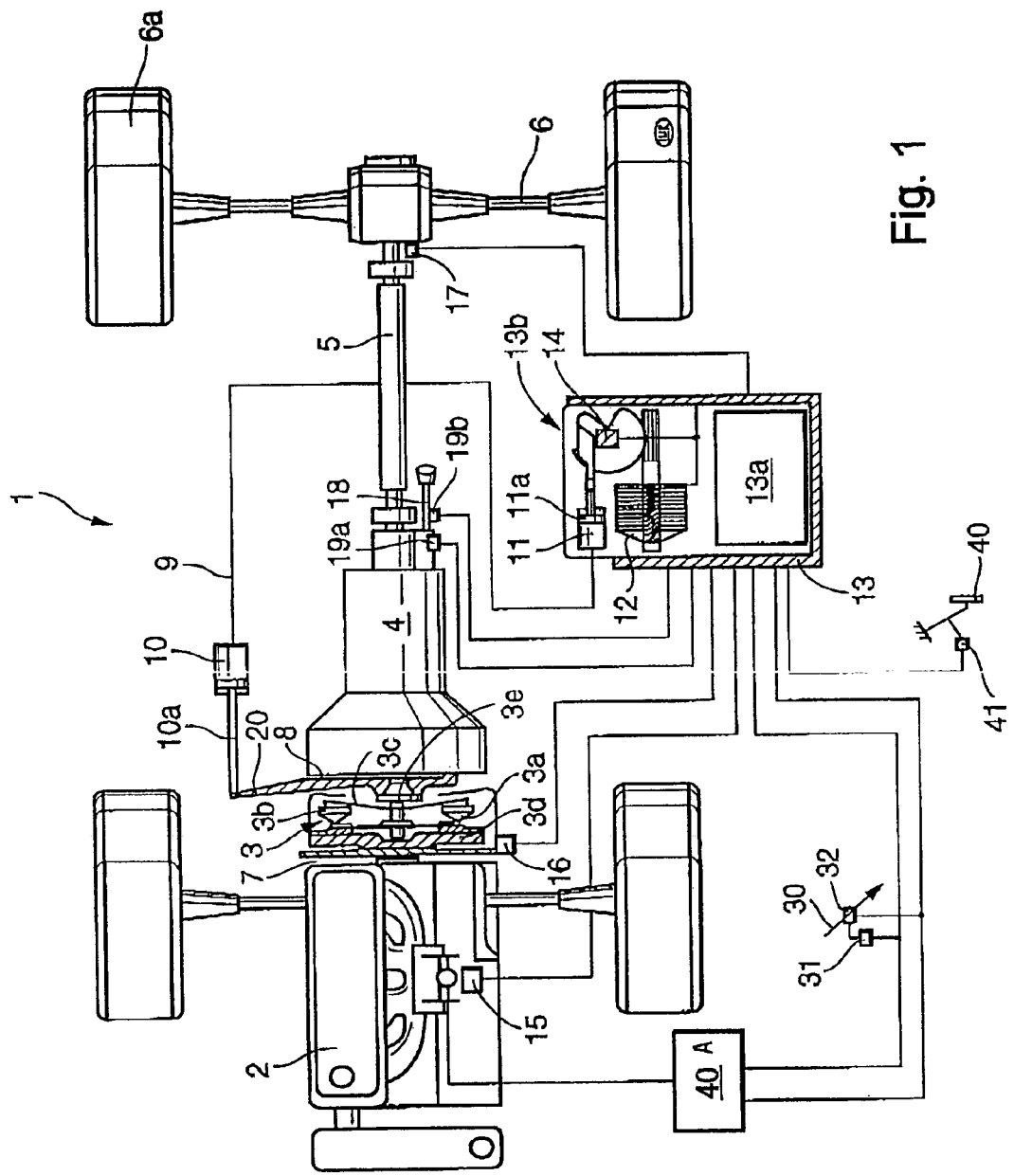
FIG. 1 is a schematic partly elevational and partly cross-sectional view of a motor vehicle having a representative power train suitable for use with the various aspects of the present teachings.

The present teachings generally provide methods and apparatus for controlling the operation of a power train in a motor vehicle that includes a prime mover or a drive source, such as an engine or motor. An automated clutch operable by an actuating device(s) optionally may be disposed in a torque transmitting path between a transmission and the prime mover. The transmission may be, but is not limited to, an actuator-operated automated transmission. Representative methods optionally may include: (i) monitoring at least one predetermined operating condition of the power train, and (ii) operating at least one of the prime mover, the actuator for the transmission and/or the actuating means for the clutch as a function of (or in response to) the monitored operating condition. Representative apparatus optionally may include means for operating at least one of the prime mover, the actuator and/or the arrangement as a function of (or in response to) at least one predetermined operating condition of the motor vehicle.

Representative operating means may include, e.g., at least one first electronic unit, such as a computer, a control unit (such as an "ECU"), a processor and/or regulators, and at least one second electronic unit, such as one or more sensors and other electronic monitoring components or devices. The second electronic unit(s) is (are) generally disposed in signal-transmitting connection or communication with the at least one first electronic unit. The second electronic unit(s) is (are) are typically arranged and constructed to monitor the at least one operating condition of the motor vehicle and to operate at least one of the prime mover, the actuator and/or the actuating arrangement for the clutch based upon the ascertained at least one operating condition of the motor vehicle.

Representative operating means also optionally may be arranged and constructed to generate and then transmit control signals to the at least one of the prime mover, the actuator for the automated transmission and/or the actuating arrangement for the clutch.

One notable method for controlling the operation of a power train in a motor vehicle may include controlling a clutch actuating mechanism so as to open a clutch with the power train being in a pull mode of operation (i.e., the engine is supplying power to drive or move the motor vehicle). Then, the transmission is changed or shifted from a first gear position to a second gear position via a neutral position, e.g., by moving or actuating a transmission actuator. In this embodiment, the transmission in the second gear position has a lower ratio than in the first gear position. At or about the same time, the ignition angle (ignition phase) of the spark-ignited combustion engine is shifted or changed during the gear change step to cause the combustion engine to temporarily generate a negative engine torque. As a result, the engine speed (RPM) is preferably decreased when the transmission is disposed in the neutral position. Consequently, a desired (e.g., higher or greater) engine torque can be rapidly realized or generated when (as soon as) the transmission actuator is disposed in the second gear position. Thereafter, with the transmission disposed in the second gear position, the clutch actuating mechanism preferably closes the clutch to permit the engine to again supply power to drive or move the wheels of the motor vehicle.

The ignition angle preferably may be shifted such that a predetermined negative torque is temporarily supplied while the transmission is disposed in the neutral position. Moreover, an adjustable torque control means of the combustion engine preferably causes the predetermined negative torque to be supplied by shifting the ignition angle. In addition or in the alternative, the power train may further include a control unit that generates signals for moving or actuating the transmission actuator. In other words, the present embodiment can be utilized with a variety of manual and automated transmissions.

In this aspect of the present teachings, apparatus are also provided for controlling the operation of a power train in a motor vehicle, which preferably includes a spark-ignited combustion engine, a transmission operable by a transmission actuator, and an automated clutch operable by a clutch actuating mechanism. The automated clutch is preferably disposed in a torque transmitting path between the combustion engine and the transmission.

Further, means for controlling the clutch actuating mechanism may be provided so as to open and close the clutch with the power train being in a pull mode of operation. Such controlling means may include, e.g., a clutch release lever or other similar constructions that are well known in the art for opening and closing (disengaging and engaging) a clutch. The present teachings are not particularly limited in this regard.

In addition, means may be provided for changing the transmission from a first gear position to a second gear position via a neutral position by moving the transmission actuator. Such changing means include manual changing means, such as a gear shift lever and automatic changing means, such as an electronic control unit that supplies gear change instructions to the transmission. Again, the present teachings are also not particularly limited in this regard.

Moreover, means may be provided for shifting an ignition angle of the combustion engine during the gear change step to cause the combustion engine to temporarily generate a negative engine torque. Preferably, the ignition angle shifting means is arranged and constructed to cause a decrease or reduction of engine speed (RPM) when the transmission is disposed in the neutral position and thereby enable a desired (higher or greater) engine torque to be rapidly realized or generated when (as soon as) the transmission actuator is disposed in the second gear position. The ignition angle generally refers to the ignition phase or ignition timing (i.e., when the spark is supplied to the combustion chamber(s) of the combustion engine in order to ignite the fuel/air mixture). Thus, changing the ignition angle also generally means changing the ignition timing within the combustion cycle. Representative, but not limiting, ignition angle shifting means include electronic control units that generate ignition signals for the respective combustion chambers of the combustion engine, although mechanical means are also possible. Thus, a variety of known devices may be easily modified so as to utilize this aspect of the present teachings.

Each of the additional features and teachings disclosed below may be utilized separately or in conjunction with other features and teachings to provide improved vehicles and methods for designing and using such vehicles. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Referring to FIG. 1, a representative motor vehicle 1 may generally include a power train that comprises a prime mover (drive source) 2, a torque transmitting system 3 (hereinafter referred to as a "clutch" for short, although other torque transmitting systems may be utilized with the present teachings) and a change-speed transmission 4. As used herein, unless otherwise specified, the term "prime mover" is intended to mean any machine, mechanism or device for converting energy to mechanical force and/or motion, including but not limited to internal combustion engines, electric motors, hydraulic or pneumatic motors, gas-electric hybrid engines, solenoids, etc. In the representative embodiment of FIG. 1, the clutch 3 is installed in a power transmitting path between the prime mover 2 and the transmission 4. Therefore, torque transmitted by an output element (e.g., a crankshaft or a camshaft) of the prime mover 2 is adapted to cause rotation of an output shaft 5 of the transmission 4 and the driven wheels 6a of the motor vehicle 1 via a differential and driven axle 6.

The clutch 3 may include or constitute any one of a plurality of known clutches, such as a friction clutch, a multiple-disc clutch, a magnetic powder clutch or a torque converter bypass or lockup clutch. Furthermore, the clutch may constitute a self-adjusting (automatically adjustable) or a wear-compensating clutch, such as a clutch of U.S. Pat. No. 5,409,091.

The transmission 4 may be, e.g., an interruption-free (uninterrupted) shifting gear (also known as "USG"). However, improved power trains may also employ an automated shifting gear (also known as "ASG" or "automated transmission") that can be shifted automatically by utilizing one or more actuators. As used herein, the term "automated shifting gear" is intended to denote an automatic transmission that is shifted with interruption of traction and at least one actuator initiates the shifting into different gears.

In addition, the USG shifting gear may also constitute an automatic transmission that can be shifted into different gears essentially without interruption of traction and which is constructed of planetary stages.

In various aspects of the present teachings, it is also possible to employ a transmission that includes or constitutes a continuously or infinitely variable transmission (CVT) employing a system of pulleys and belts, e.g., a transmission of U.S. Pat. No. 5,295,915. Moreover, an automatic transmission can be installed in the improved power train upstream of a clutch or an analogous torque transmitting system, such as a clutch or friction clutch. Still further, the clutch 3 can constitute (a) a starter clutch or a direction or movement reversing clutch (the German term for which is "Wendesatzkupplung") or (b) a safety clutch with an accurately selected transmittable torque. Moreover, the clutch 3 may constitute a dry friction clutch or a wet friction clutch (the latter can be positioned so as to operate within a body of liquid). It is also possible to replace the illustrated clutch 3 with a torque converter.

As indicated by this description, and unless specifically noted, the present teachings are not particularly limited with regard to the clutch 3 or the transmission 4.

The clutch 3 shown in FIG. 1 has an input side or section 7 and an output side or section 8. Transmission of torque from the input side 7 to the output side 8 is accomplished by urging a clutch disc 3a against a flywheel (counter-pressure plate) 3d using a pressure plate 3b that rotates with the flywheel 3d and can be axially moved by a diaphragm spring 3c and a release or disengaging bearing 3e. A release lever 20 is coupled to the bearing 3e and can receive motion from an actuating arrangement 13b (hereinafter called an "actuator") by way of a master cylinder 11, a hydraulic conduit 9 and a slave cylinder 10 having a piston rod 10a. Reference may be had, for example, to commonly-owned U.S. Pat. No. 5,135,091 for further useful teachings concerning this aspect of the present teachings.

A control unit 13 may control the operation of the clutch 3 and may be, for example, a control unit 13 that includes an electronic system 13a and the above-described actuator 13b. Although FIG. 1 shows the parts 13a, 13b of the control unit 13 installed in a common housing, it is equally within the purview of the present teachings to employ discrete or separate housings for the electronic system 13a and for the actuator 13b, i.e., to assemble the control unit 13 from a plurality of discrete components.

The control unit 13 can be designed to contain the regulating and output electronics that operate the motor 12 of the actuator 13b. This design is advantageous, for example, because the system that operates the clutch 3 can be accommodated in a single space or compartment for the actuator 13b and the associated electronics. The actuator 13b comprises the above-described motor 12 (e.g., an electric motor) and a gearing device (e.g., a worm gear drive, a drive employing spur gears, a crank drive or a feed screw drive), which serves to actuate the piston rod 11a of the master cylinder 11, either directly or indirectly (e.g., via a linkage). The piston rod 11a constitutes the output element of the actuator 13b and its movements are monitored by a suitable sensor 14. The sensor 14 transmits one or more signals representing the position and/or setting and/or velocity and/or acceleration and/or another parameter of the prime mover 2 that is (are) proportional to (or representative of) the position or condition of engagement (such as full or partial engagement or disengagement) or the speed or acceleration of the clutch 3.

The master cylinder 11 is operatively connected with the slave cylinder 10 by the above-described conduit 9, e.g., a hydraulic conduit. The output element 10a of the slave cylinder 10 is coupled to the clutch release lever 20 or an equivalent clutch actuating device. The movements of the output element 10a effect a corresponding (e.g., pivotal) movement of the clutch disengaging or release member 20 in order to ensure a proper setting of the clutch 3, i.e., the transmission of requisite torque (including zero torque) to the input element of the transmission 4.

The actuator 13b optionally may be a fluid-operated (hydraulic or pneumatic) device and may, e.g., comprise its own master and slave cylinders. The master cylinder of such fluid-operated actuator 13b preferably receives motion from a motor (such as the electric motor 12) that is operated by the electronic control unit 13. However, it is equally within the purview of the present teachings to replace the electric motor 12 with a hydraulic or pneumatic motor. Moreover, it is possible to employ at least one magnetically operated actuator, e.g., to select the position of the piston rod 11a of the master cylinder 11 and/or the position of the piston rod 10a of the slave cylinder 5 and/or the position of the clutch release lever 20.

The clutch 3 of FIG. 1 optionally may be, e.g., a known friction clutch such as the clutch disclosed in commonly-owned U.S. Pat. No. 5,409,091. When this clutch 3 will be at least partially engaged, the diaphragm spring 3c causes the pressure plate 3b to move the friction linings of the clutch disc 3a into a more or less pronounced frictional engagement with the counter-pressure plate (flywheel) 3d. In this case, the clutch disc 3a will transmit a predetermined amount of torque to the input element of the transmission 4.

The clutch release member 20 may include or constitute a fork or a central engaging/disengaging device, which is designed to subject the diaphragm spring 3c to a requisite stress (pressure) that is necessary to ensure or guarantee a corresponding frictional engagement between the friction linings of the clutch disc 3a on the one hand, and the pressure plate 3b and the counter-pressure plate 3d on the other hand. The pressure plate 3b is movable to (and between) and can be fixed in two end positions and a finite or infinite number of intermediate positions. In one of the two end positions, the pressure plate 3b allows the counter-pressure plate 3d to rotate independently of the clutch disc 3a. In the other end position, the pressure plate 3b compels the clutch disc 3a to rotate at the same speed as the plates 3b and 3d. In other words, the clutch 3 is operated without slip.

In order to transmit a pre-selected torque that is less than the maximum transmissible torque (i.e., less than the torque that the output element of the prime mover 2 transmits to the counter-pressure plate 3d), the release lever 20 may be pivoted by the slave cylinder 10 to assume and remain in a predetermined angular position.

It is equally possible to select the clutch torque in such a way that it departs from the corresponding momentary engine (prime mover) torque. For example, the clutch 3 may be utilized to transmit actual engine torque but without any fluctuations such as peak torque, which is damped and/or insulated.

The representative power train of FIG. 1 may preferably employ one or more additional sensors that monitor selected parameters and transmit signal(s) to the corresponding inputs of the control unit 13. The additional sensor(s) is (are) preferably designed, installed and operated to monitor, at least intermittently, the relevant parameters of the entire power train including the prime mover 2, the clutch 3, the transmission 4 and, if necessary, one or more additional constituents of the power train.

The thus obtained signals are processed by the control unit 13, which then transmits appropriate signals to the motor 12 of the actuator 13*b*. In addition, the control unit 13 can transmit appropriate signals to an electronic control system (not shown) for the prime mover 2 and/or to an electronic control system of an anti-lock braking system (also known as "ABS") and/or to an anti-slip regulator (also known as "ASR"). For example, the above-described sensor(s) may be arranged and constructed to monitor, e.g., the rotational speed (RPM) of the wheels 6*a*, the rotational speed of the output element of the prime mover 2, the position of the load lever, the position of the movable portion (e.g., a flap) of the throttle valve of the prime mover 2, the selected gear of the transmission 4, the intention of the operator of the motor vehicle (i.e., the intention to select a particular gear of the transmission 4) and/or one or more other parameters that are specific for the power train and/or of other constituents of the motor vehicle 1.

FIG. 1 shows a sensor 15 arranged to monitor the position of the movable element of the throttle valve of the prime mover 2, a sensor 16 arranged to monitor the RPM of the rotary output element of the prime mover 2, as well as a tachometer generator sensor 17 arranged to monitor the RPM of the output element 5 of the transmission 4 or of a rotary part that receives torque from the output element 5. As mentioned above, these sensors preferably transmit signals to the corresponding inputs of the control unit 13. The electronic system 13*a* (e.g., a computer) of the control unit 13 processes the signals from the various sensors and/or other electronic components and transmits appropriate signals to the actuator 13*b*.

The transmission 4 may include or constitute a multispeed transmission having a shift lever (or fork) 18 that is arranged to be shifted into selected gears and/or to otherwise select the desired gear (speed) ratio of the transmission. The lever 18 preferably cooperates with at least one sensor 19*b* that serves to detect the intended gear and/or the selected gear of the transmission 4 and transmits appropriate signals to the control unit 13. A further sensor 19*a* also may be associated with the transmission 4 for detecting the actual gear and/or the intended gear of the transmission 4. The intended gear selection can be detected by at least one of the sensors 19*a*, 19*b*, e.g., if the at least one sensor is a power sensor or force sensor that is designed to detect the magnitude of the force being applied to the gear shifting lever 18. However, it is also possible to utilize at least one of the sensors 19*a*, 19*b* as a position or distance sensor that transmits signals enabling the control unit 13 to ascertain (e.g., based on the timely change of the position signal) the intended shifting of the transmission 4 into a particular gear.

The control unit 40A preferably receives signals from the control unit 13 and controls the operation of the throttle valve in the prime mover 2 of the motor vehicle 1.

The control unit 13 may be permanently or intermittently connected with (coupled to) one or more of the sensors and is preferably capable of processing the incoming signals and system input values in such a way that, based upon the actual operating point of the control unit 13, the latter transmits control signals and regulating signals to the at least one actuator 13*b*. The motor 12 of the actuator 13*b* receives (e.g., from the control section of the unit 13, which preferably initiates the actuation of the clutch 3) a signal of an intensity and/or another characteristic that is a function of the processed values and/or signals and/or input values originally supplied by the relevant sensors. In this case, the control unit 13 executes a control program in the form of hardware or software that evaluates or processes the incoming signals and calculates and/or otherwise ascertains the output values on the basis of comparisons and/or functions and/or characteristic fields.

The control unit 13 preferably may include a torque ascertaining unit or device, with a gear position determining unit or device, with a slip determining unit or device and/or a condition ascertaining unit or device. In addition or in the alternative, the unit 13 may be in signal-transmitting communication with at least one such device. These devices can be implemented by control programs as hardware and/or software so that, based upon the incoming sensor signals, the torque of the prime mover 2 of the motor vehicle 1 the momentary gear of the transmission 4 as well as the slippage prevailing in the region of the clutch 3 and the actual operating condition of the motor vehicle 1 can be ascertained with a requisite degree of accuracy.

The momentary gear of the transmission 4 is dependent upon the signals from the sensors 19*a*, 19*b* to ascertain the selected (actual) gear of the transmission. These sensors 19*a*, 19*b* are operatively associated with (e.g., movably mounted on) the gear shifting lever 18 and/or with shifting means in the interior of the transmission 4 (e.g., with the central gear shifting shaft or rod) and serve, for example, to detect the position and/or the speed of the monitored constituent(s) of the transmission 4.

The power train of FIG. 1 may also employ a sensor 31 that is arranged to monitor the position of a load applying member 30, e.g., the gas (accelerator) pedal of the motor vehicle 1. A further sensor 32 may be provided to serve as an idling switch. In other words, the sensor 32 may be inactive when the load applying member 30 is actuated but is automatically activated when the load applying member 30 is not depressed by the operator of the motor vehicle 1. Such digital (e.g., binary) information is provided to enable a determination of the position of the member 30, i.e., whether or not the prime mover 2 is receiving fuel. The other sensor 31 furnishes signals (e.g., digital or analog signals) denoting the extent of actuation (depression) of the load applying member 30.

FIG. 1 further shows a brake actuating element or device 40 that serves to operate the standard brake or the parking brake of the motor vehicle 1. The device 40 may include or constitute a foot-operated lever (e.g., a brake pedal), a manually operable handgrip member (e.g., a parking brake lever) or an otherwise installed and/or configured foot- or hand-operated device. The latter is associated with at least one sensor 41 that is arranged to monitor the position and/or other parameter(s) of the element/device 40 and transmit signals to the electronics 13*a* and/or to at least one other part of the control unit 13. For example, the sensor or monitoring device 41 optionally may include or constitute a digital (binary) sensor (such as a switch) which is constituted to ascertain whether or not the device 40 is or has been actuated. Signals from the sensor 41 can be employed to actuate an indicator, e.g., a lamp, which furnishes information pertaining to the condition or state (e.g., activated or idle state) of the brake(s). This design may be utilized regardless of whether the element 41 is arranged and constructed to actuate a standard brake or a parking brake. However, it is also possible to replace the digital sensor 41 with an analog sensor, e.g., a potentiometer, which serves to indicate the extent of actuation (depression) of the brake by the element 40. Such an analog sensor may also serve to control one or more indicators in the form of lamps or the like.

The monitoring of the action of the brake or brakes, which is or are controlled by the element 40, can be carried out by utilizing the sensor 41, which may be arranged to determine the fluid pressure in one or more hydraulic conduits. An advantage of such fluid pressure monitoring sensor or sensors is that redundant testing of the brake is possible, which is vital for the safety of the motor vehicle 1 and its occupant(s). For example, if the brake being controlled by the element 40 is an electrical brake, its braking action can be ascertained by measuring the electric current and/or voltage and/or by monitoring the strength of the magnetic field. Such sensor or sensors can be set up to ascertain a desired braking engagement or the extent (degree) of the braking action as desired by the operator or as the actual braking effect in the form of a feedback signal by the brake actuating means. For example, one advantage is that an advance regulation of creeping torque can be built up, by way of a braking pressure switch, and a more spontaneous creeping movement of the motor vehicle 1 is possible. Furthermore, and as concerns (for example) the determination of the scanning point, another advantage is that the extent to which the braking system is filled with a hydraulic fluid can be reliably ascertained.

The representative power train shown in FIG. 1 optionally may be operated by initiating a shifting or switching operation, for example, by actuating the load applying member 30 in an attempt to develop an appropriate shifting strategy (e.g., a strategy involving a gear shifting operation with an automated transmission 4 or the like) in response to an apparent shifting desire of the operator without it being necessary for the operator to perform any additional action in order to effect the gear shift operation. In accordance with this feature of the present teachings, the desire of the operator that the power train perform a specific gear shifting operation can be satisfied and ascertained in a preferred manner based on a predetermined progress of a series of positions of the load applying member 30 or the like. For example, it has been ascertained that, upon an actuation of the load applying member 30 and a following abruptly changed driving situation that necessitates a different position of the load applying member 30, a certain (predetermined) interval of reaction time must invariably elapse before the operator changes the position of the load applying member 30. Consequently, it can be assumed that the operator knowingly (i.e., intentionally) desires to generate a signal (or more specifically, that the operator intentionally causes the sensor means and the associated components of the power train to produce a signal) that is not generated during normal driving conditions or circumstances.

In accordance with this optional embodiment, one or more steps may be performed that include or involve an addition or deduction of a calibrated value ($\Delta P$) within a calibrated time interval ($\Delta T$). For example, if such interval $\Delta T$ is shorter than, e.g., about 200 to 400 milliseconds, it can be assumed that such sequence is being provoked by the operator on purpose, i.e., intentionally. The operator is enabled, in the simplest possible way, to reach such position or situation by resorting to a short tip-in (pedal toe-in) or tip-out (pedal toe-out) with subsequent return movement to the original position of the load applying member 30.

Figure 2:
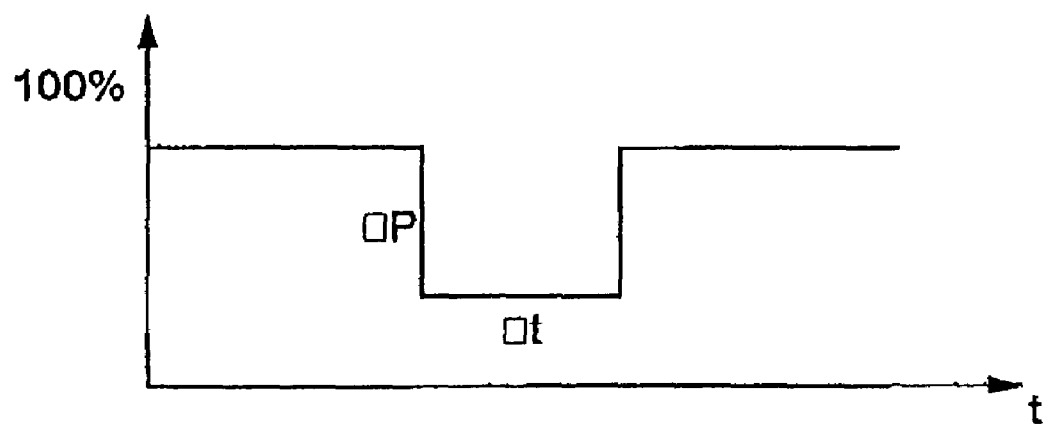
FIG. 2 shows a coordinate system wherein the curve denotes an example of shifting the transmission of the power train into a higher gear.

The coordinate system of FIG. 2 illustrates a representative example of shifting the transmission 4 into a higher gear. The time t increases along the abscissa and the extent of movement or shifting (gas pedal angle in percent) increases along the ordinate. The curve denotes the angular position of the pedal 30 as a function of time.

Figure 3:
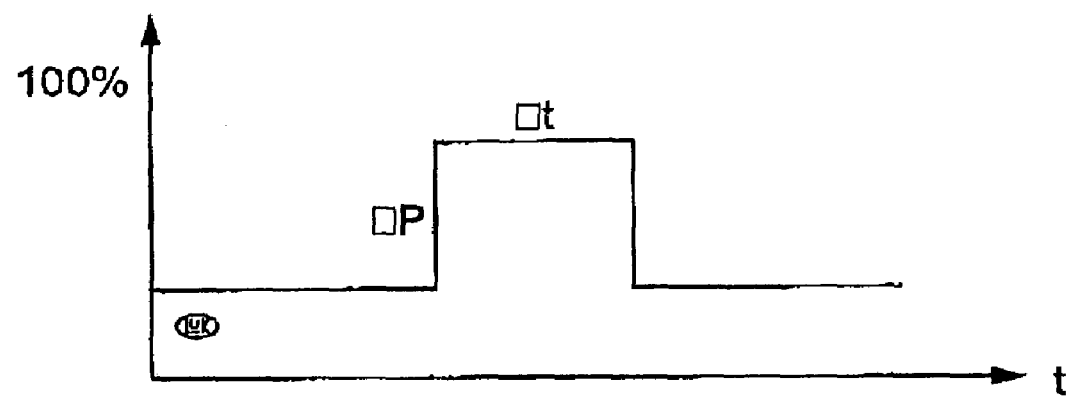
FIG. 3 illustrates a coordinate system wherein the curve denotes an example of shifting the transmission of the power train into a lower gear.

The coordinate system of FIG. 3 shows a representative example of shifting the transmission 4 into a lower gear and the abscissa and ordinate again respectively represent time and the extent of movement or shifting. The curve of FIG. 3 again represents the angular position of the load applying member 30 as a function of time. Each of FIGS. 2 and 3 further shows the calibratable value $\Delta P$ as well as the calibratable time $\Delta T$.

By way of example, the proposed shifting strategy can be integrated into existing operating means (software) to regulate the operation of the transmission 4 by preferably realizing a supplemental strategy in addition to the existing strategy in the automatic mode. To this end, a down-shift (without any action by the operator of the motor vehicle 1) can be achieved already in that one facilitates a suitable calibration of the so-called fast-off (i.e., when the operator quickly withdraws or pulls back his/her foot from the load applying member 30). Thus, the gas pedal angle is increased when the fast-off is performed and, depending upon the calibration of the characteristic field, a bit is set (fast-off) during the following rapid reduction of the gas pedal angle to prevent a renewed shifting into a higher gear.

In order to shift into a higher gear without any action by the operator of the motor vehicle 1, a corresponding bit may be set when the movement of the load applying member 30 corresponds to the movement pattern shown in FIG. 2. The newly selected gear can be located within a hysteresis range of the characteristic shifting field during shifting into a higher gear, as well as during shifting into a lower gear. In this case, the selected gear is not reversed by the following gas pedal angle and the target gear that is evaluated by the characteristic field.

In accordance with an advantageous further development of the present teachings, an additional mode can be introduced into the regulation of the transmission in order to realize the above-described shifting strategy. For example, this additional mode can be activated by way of a switch or the like. By activating such an additional mode, the proposed shifting strategy can be utilized in order to shift into a higher or into a lower gear to the extent permitted by the resultant RPM of the prime mover 2. At such time, protection against excessive or insufficient RPM should be taken into account. For example, such a strategy preferably results in an automatic shifting operation into a higher gear when the RPM reaches a maximum value and the angle of the gas pedal also assumes a maximum value. Furthermore, it is desirable that an automatic backshift occur during rolling out as soon as the actual RPM drops below the idling RPM of the prime mover 2 in the selected gear. Further, provision can be made to ensure that a backshift with kick-down occur during shifting from a lower load to a full load. This strategy is particularly desirable when the progress of shifting into higher gear is not carried out in the manner shown in FIG. 2.

In circumstances that do not correspond to those depicted in FIGS. 2 and 3, it is also possible to utilize such an automatic shifting strategy when considered advisable or necessary. For example, such strategy could involve a backshift at a kick-down position or the like.

The present shifting strategy may be preferably utilized in connection with automated transmissions, e.g., an automated shifting gear (ASG), an interruption-free shifting gear (USG), a parallel shifting gear (PSG) or an electric shifting gear (ESG).

The representative power train shown in FIG. 1 optionally may be operated so as to prevent a dragging or towing operation from being performed in a wrong or incorrect gear. In this representative embodiment, the motor vehicle 1 is prevented from towing with the transmission in a gear that does not correspond to the intended direction of movement. Naturally, utilization of the wrong direction gear would result in a rotation of the prime mover 2 in the wrong direction.

The sensors that monitor the speed of the motor vehicle 1 typically do not generate a signal denoting the movement direction (i.e., forward or reverse) of the motor vehicle 1. For example, if the vehicle 1 moves in the reverse direction, the automated clutch 3 will be engaged when the transmission RPM reaches a threshold value in order to start the prime mover 2. Therefore, a sensor is usually provided to monitor signals representing the direction of rotation of the prime mover 2. The thus supplied signal(s) serve(s) to determine whether or not the engine controls should cause fuel to be injected into the prime mover 2. Fuel is not injected when the direction of rotation is wrong. However, the clutch 3 remains engaged until the operator terminates the towing operation in order to prevent a towing operation in the wrong direction.

A dragging or towing operation in the wrong gear can be avoided by ascertaining or recognizing the above-described situation. For example, the signal representing the direction of rotation or other error signals of the prime mover regulating means can be properly evaluated, e.g., by clutch and/or transmission regulation. It is also possible to utilize the clutch and/or transmission controls for evaluation of the signal(s) that is (are) indicative of the direction of vehicle movement.

The evaluation of the (a) signal representing the direction of rotation of the prime mover 2 or (b) other error signals of the prime mover 2 by the clutch 3 and/or the transmission regulation can be utilized, for example, to disengage the clutch 3 and to thus prevent a towing operation in a wrong gear. It is also conceivable to additionally shift the transmission 4 out of a forward or rearward gear and into neutral if the transmission 4 is an automated gearbox, such as an XSG system.

An evaluation of signals, which represent the direction of movement, by the control units of the transmission 4 and/or clutch 3 renders it possible to prevent a towing operation while the transmission 4 is in the wrong gear. To this end, it can be provided—by way of example—to ensure that, when the power train employs an automated transmission 4, the towing takes place when the selected gear corresponds to (i.e., is suitable for) the intended direction of vehicle travel. In addition, provision can be made to ensure that, if the vehicle 1 is moving in the reverse direction, the transmission 4 is in the neutral gear, thereby preventing towing. Furthermore if the power train employs an electronic clutch management system (EKM) and an automated transmission (XSG) system, clutch engagement is prevented if the direction of movement of the motor vehicle 1 is not correlated to the selected gear of the transmission 4.

In accordance with a further aspect of this embodiment, an appropriate warning can be provided for the operator of the motor vehicle 1, for example, by employing a buzzer, a horn, a piper or another suitable warning signal generator, if the wrong gear has been selected for a towing operation.

The representative power train shown in FIG. 1 also optionally may be operated utilizing various instructions pertaining to the engine torque to generate slow or rapid torque changes in the neutral stage of gear shifting in order to rapidly re-establish or re-generate suitable engine torque after a gear change operation. An object of this aspect of the present teachings is to improve or enhance the change of engine torque and to shorten the time interval that is required for reengagement of the clutch following a gear shift, especially under those circumstances when engine thrust turnoff is not active.

For example, when the transmission 4 is in neutral during a "pulling" operation (i.e., the prime mover 2 is supplying torque to drive or move the wheels of the motor vehicle 1), the prime mover 2 preferably furnishes a high thrust torque in order to ensure that the engine RPM is rapidly brought on a par with the lower transmission output RPM. In this case, ASG regulation is preferably utilized to require from the engine controls a negative engine torque of between about −10 and −60 Nm, which is normally above the maximum available thrust torque. In the known art, the engine controls provide (make available) the required torque by reducing the supply of air by closing of the throttle valve. However, this valve closing operation creates the possibility that the engine torque increase following the neutral phase will be effected only after a considerable delay due to the small quantity of air provided to the prime mover 2 during the gear change operation. This delay is naturally dependent upon the dynamics of the throttle valve adjustment.

In accordance with the present teaching, the desired torque is preferably achieved by a shifting the ignition angle (i.e., ignition phase shift) during and after the gear change operation, which thereby results in a more rapid torque increase after the gear change has been performed. The termination of adjustment of the ignition angle, which is subsequent to the neutral phase for the reestablishment of engine torque, is then possible at a higher engine speed, thereby minimizing or eliminating the reaction time delay after the order to increase engine torque is received.

Two torque selections optionally may be performed. For example, the first torque selection may include a temporary negative torque that is to be furnished when the transmission 4 is disposed the neutral position during the gear change operation. This negative torque may preferably be in the range of about −10 to −60 Nm. After the transmission 4 is disposed in the next gear (e.g., having a lower transmission or gear ratio), the desired torque for the continued operation of the motor vehicle 1 is preferably built up (generated) very rapidly following the neutral phase and may preferably be in the range of about 0 to 16 Nm. The goal is to open (e.g., via control unit 40A) the throttle valve to such an extent that the applied desired torque can be realized very rapidly over the adjustment of the ignition angle. It is preferred to accord priority to the required torque over the desired torque.

If the applied desired torque is too high and causes, in spite of a maximal ignition angle shift, an increase of the torque being supplied by the prime mover 2, the opening of the throttle valve should not be increased. In other words, it is preferred that the desired torque be limited internally by the engine controls.

The proposed selection of torque can be put to use in all power trains with automated transmissions 4 and engines 2 that are controlled by throttle valves. However, it is also possible to utilize such torque selection in power trains that employ other suitable prime movers 2 and transmissions 4.

In another aspect of the present teaching, the representative power train shown in FIG. 1 optionally may be operated by suitably securing a change in the direction of movement of the motor vehicle, especially in those vehicles wherein the power train employs an automated transmission (ASG). For example, in the event of a break in the selector actuating means, the transmission controls can continue to measure selection increments, even though the selector finger or lever or fork in the transmission 4 is no longer capable of moving in the selected direction. This break could lead to a shifting into wrong gears. For example, if the first gear and the reverse gear are adjacent each other in the shifting layout, a desired change from the reverse gear into the first gear could result in renewed engagement of the reverse gear without any gear shifting movement. Consequently, this shift error could result in a movement of the motor vehicle 1 in the wrong direction.

Figure 4:
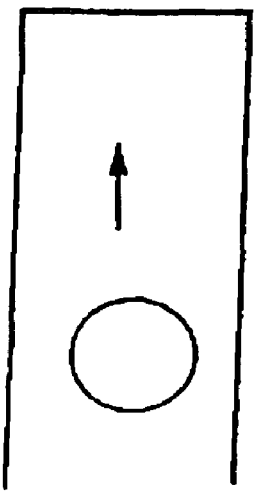
FIG. 4 is a schematic plan view of a representative guide for the gear shifting element of the transmission.
Figure 5:
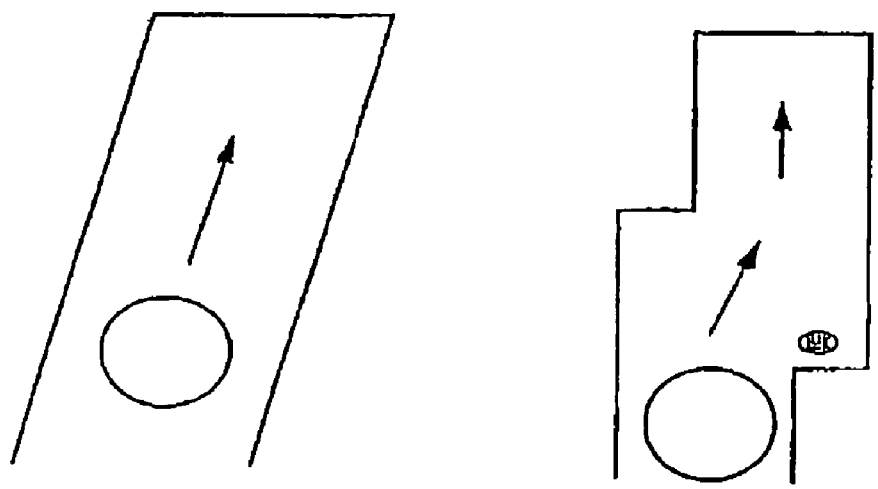
FIG. 5 is a similar view showing two modified representative guides for the gear shifting element.

In order to shift the transmission 4 into a different gear, it is normally necessary only to effect a movement of the gear shifting motor as soon as the gear shifting finger reaches the desired path in the guide for the shifting finger. In this regard, FIG. 4 shows a standard gear layout or path for shifting into a selected gear. This layout contemplates a single movement of the motor for the gear shift lever 18. In accordance with this feature of the present teachings, the movement in the transmission 4 is carried out along a guide (e.g., a coulisse) in such a way that, during shifting into or out of a particular gear, a suitable selective movement is required. FIG. 5 shows two representative forms of such guides that are designed to permit a guided element to slide or glide there along.

One advantage of the arrangements shown in FIG. 5 is that, if the actuator breaks, the corresponding gear cannot be shifted into or disengaged. Thus, shifting into a wrong gear is no longer possible (prevented).

Furthermore, the above-described arrangement renders it possible to detect the above-described situation because, as seen in the shifting direction, the wall of the guide serves as an abutment or a stop. Consequently, the vehicle 1 can continue to move with the transmission 4 in the previously selected gear, but no further gear shift is possible. Therefore, and by way of example for the path of the reverse gear, it is now possible to prevent improper shifting into the reverse gear due to a break in the gear shifting actuator. If the gear shift is to take place from the reverse gear into the first gear, the transmission 4 will remain in reverse gear. However, the disengagement of the clutch 3 prevents an advancement of the motor vehicle 1 in the wrong direction. The above-described guide for the gear shift lever can be utilized in all automated transmissions 4 having, e.g., a coulisse-shaped guide for the gearshift lever 18.

Additional teachings relevant to, and advantageously combinable with the present teachings, are found, e.g., in commonly-owned U.S. Pat. Nos. 5,409,091, 5,295,915, 5,217,412 and 5,135,091, the contents of which are hereby incorporated by reference as if fully set forth herein.

The invention claimed is:

1. An automated transmission for a power train of a motor vehicle comprising:
    a gear shifting member,
    a selector actuating means for moving said gear shifting member along a selection direction to at least one selecting position for selecting a gear to be shifted, the at least one selecting position representing a neutral status of the transmission,
    a gear shifting motor arranged and constructed to move said gear shifting member along a shifting direction, which is different from said selecting direction, so as to shift the automated transmission into the selected gear, and
    a guide designed to enable a guided member to slide or glide there along such that the gear shifting member moves along at least one predetermined path for shifting the automated transmission into the selected gear from the at least one selecting position, wherein the guide comprises at least one wall defining the at least one predetermined path between the selecting position and a gear engaged position and the at least one wall is shaped such that the gear shifting member is required to move in both the shifting direction and the selecting direction when the gear shifting member is moved from the at least one selecting position to the gear engaged position.

2. An automated transmission as in claim 1, wherein the at least one predetermined path is a path arranged to shift the automated transmission into a first gear or a reverse gear from a selecting position common to both the first and reverse gear.

3. An automated transmission comprising:
    a gear shifting member,
    a selector actuating means for moving said gear shifting member along a gear selection direction to at least one selecting position for selecting a gear to be engaged,
    a gear shifting motor arranged and constructed to move said gear shifting member along a shifting direction, which is different from said selecting direction, so as to move the gear shifting member from the at least one selecting position to a gear engaged position, and
    guide means for guiding the movement of the gear shifting member along at least one predetermined path between the at least one selecting position and a gear engaged position, wherein the guide means comprises a guide having a wall defining the at least one predetermined path and a guide member arranged and constructed to slide there along, wherein the guide means is configured such that the gear shifting member is required to move in both the shifting direction and the selecting direction when the gear shifting member is moved from the at least one selecting position to the gear engaged position.

4. An automated transmission as in claim 3, wherein the at least one selecting position represents a neutral status of the transmission.

5. An automated transmission as in claim 4, wherein the at least one predetermined path is a path arranged to shift the automated transmission into a first gear or a reverse gear from a selecting position common to both the first and reverse gear.

6. An automated transmission as in claim 5, wherein the wall is one of:
    (i) inclined by an acute angle from the shifting direction, which is perpendicular to the selection direction or
    (ii) stepped shaped with one leg parallel to the selection direction and at least one leg perpendicular thereto.

7. An automated transmission as in claim 3, wherein the wall is one of:
    (i) inclined by an acute angle from the shifting direction, which is perpendicular to the selection direction or
    (ii) stepped shaped with one leg parallel to the selection direction and at least one leg perpendicular thereto.

8. An automated transmission as in claim 4, wherein the at least one shifting guide path is a path arranged to shift the automated transmission into a first gear or a reverse gear from a selecting position common to both the first and reverse gear.

9. An automated shift transmission comprising:
    a guide designed to enable a guided element to slide or glide there along, the guide defining a gear selecting guide path having a gear selecting direction, which guide path represents a neutral status of the transmission, and a plurality of shifting guide paths each respectively extending between the gear selecting guide path and a respective gear engaged position, at least one shifting guide path of the guide being defined by a wall having a shape that is one of:
(i) inclined by an acute angle from a shifting direction that is perpendicular to the gear selecting direction or
(ii) stepped shaped with one leg parallel to the gear selection direction and at least one leg perpendicular thereto,
such that a gear shifting member is required to move in both the gear selecting direction and the shifting direction to reach the respective gear engaged position from the gear selection guide path.

10. An automated transmission as in claim 9, further comprising a selector actuating means for moving said gear shifting member along the gear selection direction to the at least one selecting position for selecting the gear to be engaged.

11. An automated transmission as in claim 10, further comprising a gear shifting motor arranged and constructed to move said gear shifting member along the shifting direction so as to move the gear shifting member from the at least one gear selecting position to the gear engaged position.

* * * * *